W. CONWAY.
VEHICLE RUNNING GEAR.
APPLICATION FILED MAR. 1, 1920.
1,392,118.
Patented Sept. 27, 1921.
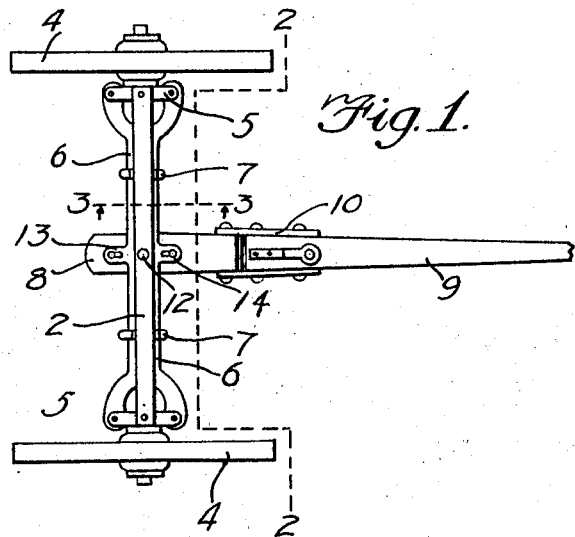
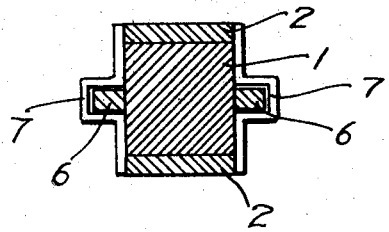
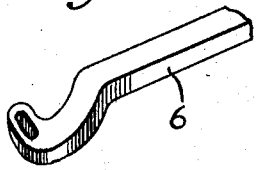
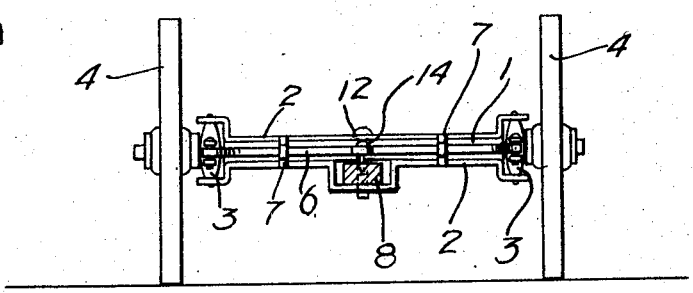
Wm. Conway
INVENTOR
BY Victor J. Evans
ATTORNEY
WITNESS:

UNITED STATES PATENT OFFICE.

WILLIAM CONWAY, OF SOO, ONTARIO, CANADA.

VEHICLE RUNNING-GEAR.

1,392,118.   Specification of Letters Patent.   Patented Sept. 27, 1921.

Application filed March 1, 1920. Serial No. 362,183.

*To all whom it may concern:*

Be it known that I, WILLIAM CONWAY, a subject of the King of Great Britain, residing at Soo, in the Province of Ontario and Dominion of Canada, have invented new and useful Improvements in Vehicle Running-Gears, of which the following is a specification.

This invention relates to improvements in running gears for horse propelled vehicles and the principal object of the invention is to provide means for preventing the pole from injuring the horses when a vehicle is pulled over rough or uneven roads.

Another object of the invention is to pivot the wheel spindles on the front axle and to provide means whereby the turning of the wheels will cause the tongue to be moved in the same direction as said wheels.

Still another object of the invention is to provide a two part tongue with means for hinging the two parts together.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the front part of the running gear of the wagon provided with my invention.

Fig. 2 is a section on line 2—2 of Fig. 1.

Fig. 3 is a section on line 3—3 of Fig. 1.

Fig. 4 is a detail view showing the formation of the end part of one of the sliding bars.

In these views 1 indicates the front axle which is preferably constructed of wood and has bolted thereto, on its top and bottom faces, iron straps 2 which have their ends projecting beyond the ends of the axle. These projecting ends pivotally support the spindle knuckles 3, the spindles of which carry the wheels 4. These knuckles are provided with the arms 5 which project from the front and rear sides of the knuckles. Slidable rods 6 are connected with the front and rear sides of the axle by the guides 7. These rods have outwardly curved ends which are pivotally connected to the arms. In this way when the wheels are turned said rods will move longitudinally upon the axle.

The pole is formed of the base part 8 and the main part 9, said parts being hinged together by the hinge 10 so that the main part may be swung in a vertical plane. The base part 8 passes through the axle and is pivoted thereto by the bolt 12 and each of the sliding rods 6 is provided with a central offset part 13, which is slotted to receive a pin 14 in said base.

It will thus be seen that when the tongue is moved from one side to the other in making a turn this movement will be communicated to the wheels by means of the sliding rods and this construction will take the "whip" out of the pole when the vehicle is being drawn over rough or uneven roads.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A wagon gear comprising a front axle, straps secured to the upper and lower faces of said axle and having their ends projecting beyond the ends of the axle, spindle knuckles pivoted between the said ends, arms projecting from the front and rear of each knuckle, rods slidably mounted on the front and rear faces of the axle and having their ends curved outwardly and pivotally connected with the arms, a tongue pivoted to the axle and having a rear part extending beyond the axle, a slotted offset part at the center of each sliding rod and bolts in the tongue and engaging the slots in said offset parts.

In testimony whereof I affix my signature.

WILLIAM CONWAY.